(12) United States Patent
Liu et al.

(10) Patent No.: US 12,535,711 B2
(45) Date of Patent: Jan. 27, 2026

(54) INORGANIC MULTI-COLOR TRANSMISSION ELECTROCHROMIC FILMS, ELECTROCHROMIC COATED GLASS ELECTRODES AND THE DESIGN METHOD

(71) Applicant: ZHEJIANG UNIVERSITY, Hangzhou (CN)

(72) Inventors: Yong Liu, Hangzhou (CN); Ziqiang Cheng, Hangzhou (CN); Gaorong Han, Hangzhou (CN); Jianliang Mo, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 704 days.

(21) Appl. No.: 17/801,778

(22) PCT Filed: Mar. 17, 2022

(86) PCT No.: PCT/CN2022/081441
§ 371 (c)(1),
(2) Date: Dec. 15, 2022

(87) PCT Pub. No.: WO2022/257532
PCT Pub. Date: Dec. 15, 2022

(65) Prior Publication Data
US 2024/0210779 A1 Jun. 27, 2024

(30) Foreign Application Priority Data
Jun. 10, 2021 (CN) .......................... 202110646631.0

(51) Int. Cl.
*G02F 1/153* (2006.01)
*G02F 1/1524* (2019.01)

(52) U.S. Cl.
CPC .......... *G02F 1/1533* (2013.01); *G02F 1/1524* (2019.01); *G02F 2001/1536* (2013.01)

(58) Field of Classification Search
CPC ................. G02F 1/1533; G02F 1/1524; G02F 2001/1536
(Continued)

(56) References Cited

U.S. PATENT DOCUMENTS 3,578,843 A * 5/1971 Castellion ............. G02F 1/1524
359/267
4,844,591 A 7/1989 Vitrage
(Continued)

FOREIGN PATENT DOCUMENTS

| CN | 103323403 | 9/2013 |
|----|-----------|--------|
| CN | 107479293 | 12/2017 |

(Continued)

OTHER PUBLICATIONS

Hussain "Optical constants and electrochromic characteristics of MxWO3 bronzes" Applied Optics, vol. 57, Issue 20, pp. 5720-5732 (2018) (Year: 2018).*

*Primary Examiner* — George G. King
(74) *Attorney, Agent, or Firm* — Jiwen Chen; Joywin IP Law PLLC (57) ABSTRACT

The present invention discloses an inorganic multi-color transmission electrochromic film, coated glass and a design method. The coated glass comprises a glass substrate and the inorganic multi-color transmission electrochromic film stacked in sequence. The inorganic multi-color transmission electrochromic film comprises a dielectric layer (optionally added), a current collecting interference layer, a sacrificial layer, an electrochromic layer, and an electron blocking layer (optionally added) stacked in sequence. With the help of thin film optics principle to design transmittance and color coordinates, optimize the material selection and thick- (Continued)

ness parameters of each film layer, and further use large-area coating technology to prepare a multilayer film structure on a clean flat glass substrate, and finally a large-area coated glass product with multi-color transmission color and electro-control effect is obtained.

2 Claims, 6 Drawing Sheets

(58) Field of Classification Search
USPC .......................................................... 359/274
See application file for complete search history.

(56) References Cited

U.S. PATENT DOCUMENTS

| | | |
|---|---|---|
| 5,724,177 A * | 3/1998 | Ellis, Jr. ................. G02F 1/157 |
| | | 359/275 |
| 10,955,717 B1 | 3/2021 | Chen et al. |
| 2007/0206263 A1* | 9/2007 | Neuman ................. G02F 1/157 |
| | | 359/267 |
| 2011/0051221 A1 | 3/2011 | Veerasamy |
| 2020/0233278 A1* | 7/2020 | Kailasam ................ C23C 14/34 |

FOREIGN PATENT DOCUMENTS

| | | |
|---|---|---|
| CN | 110514599 | 11/2019 |
| CN | 111624829 | 9/2020 |
| CN | 112180647 | 1/2021 |

* cited by examiner

INORGANIC MULTI-COLOR TRANSMISSION ELECTROCHROMIC FILMS, ELECTROCHROMIC COATED GLASS ELECTRODES AND THE DESIGN METHOD

This is a U.S. national stage application of PCT Application No. PCT/CN2022/081441 under 35 U.S.C. 371, filed Mar. 17, 2022 in Chinese, claiming priority of Chinese Application No. 202110646631.0, filed Jun. 10, 2021, all of which are hereby incorporated by reference.

TECHNICAL FIELD

The prevent invention relates to a technical field of coated glass for architectural decoration and energy saving, in particular to an inorganic multi-color transmission electrochromic film, coated glass and a design method.

BACKGROUND ART

Intelligent color change is a phenomenon in which reversible color changes are produced by external physical or chemical stimuli. According to induced color response stimuli, intelligent color change can be divided into electrochromic technology, photochromic technology, acrochromic technology, and thermochromic technology, etc.

Electrochromic technology refers to the dynamic and adjustable change of color under the condition of artificially applied voltage or current. Electrochromic technology has the advantages of good electrochemical redox reversibility, fast response speed, high color change sensitivity, long cycle life, long open-circuit memory time, and strong chemical stability. It has great application prospects in the fields of energy-saving windows, color-changing glasses, display devices, and military camouflage. The research and development of electrochromic materials and the optimization of electrochromic device structures have great economic and social significance.

Electrochromic materials can be divided into organic electrochromic materials and inorganic electrochromic materials. Although organic materials have rich color changes, they have poor environmental tolerance; inorganic electrochromic materials have good cycle stability and excellent modulation amplitude, and already have the basis for commercialization.

As the most classic inorganic electrochromic material, tungsten oxide has been widely studied by scientific researchers due to its high optical modulation rate, stable cycle characteristics and good battery and capacitance characteristics (such as patented technologies with publication numbers CN107555810A and CN110642526A, etc.). However, despite considerable development, tungsten oxide electrochromic materials still have some problems that need to be solved. For example, in terms of color control in the visible light band, tungsten oxide can only show colorless to blue control, and the color change is very monotonous, which cannot meet people's pursuit of color diversity and personalized development. The lack of such a single color makes it also limited in the field of architectural decoration.

In recent years, it has been reported that a colorful reflective electrochromic device has been prepared with a double-layer thin film structure of a metal reflective layer and an electrochromic layer. Using the thin film interference principle to expand the color gamut of inorganic electrochromic materials, the dynamic adjustment of the visible light panchromatic system is realized, which greatly enriches the color selection of inorganic electrochromic materials. However, the reflective electrochromic device only reflects light and does not have the characteristics of light transmission, and the basic requirement of architectural glass is transparency. Therefore, the color gamut expansion of the transmissive electrochromic device has a more effect on the energy saving and decoration of architectural glass.

SUMMARY OF THE INVENTION

In view of the above technical problems and the shortcomings in the art, the present invention provides an inorganic multi-color transmission electrochromic film. The structure design of the film is based on the optical parameters of each film layer, and a multilayer heterostructure model is established. With the help of thin film optics principle to design transmittance and color coordinates, optimize the material selection and thickness parameters of each film layer, and further use large-area coating technology to prepare a multilayer film structure on a clean flat glass substrate, and finally a large-area coated glass product with multi-color transmission color and electro-control effect is obtained. Based on the Fabry-Perot resonant cavity interference principle, the present invention can design and prepare inorganic colorful transmission electrochromic coated glass only on the basis of the optical parameters of the single-layer coating material. The product development cycle is short, the preparation cost is low, and the product color is various and adjustable, and the product has the effect of regulating indoor light and heat, and is suitable for the development and production of both architectural decoration and energy saving coated glass.

An inorganic multi-color transmission electrochromic thin film, comprising a current collecting interference layer, a sacrificial layer and an electrochromic layer stacked in sequence;

The thickness of the current collecting interference layer is 8-20 nm, and the material is a metal or alloy whose resistivity is less than $2.1 \times 10^{-7}$ Ω·m;

The thickness of the electrochromic layer is 100-300 nm, and the material is an inorganic electrochromic material, specifically a transition metal oxide;

The thickness of the sacrificial layer is 1-10 nm, and the material is the metal or its alloy in the transition metal oxide.

Most of the existing electrochromic devices are made of electrochromic materials on transparent conductive glass, such as Indium Tin Oxide (ITO) coated glass and Fluorine-doped Tin Oxide (FTO) coated glass. The conductive glass acts as a current collector, but basically has no effect on the color of the electrochromic material, the entire device still only relies on the electrochromic layer material to present its color. In the present invention, the current collector interference layer selects metals that meet specific resistivity requirements. First, the electrical conductivity of these metals ensures the function of the current collector. Second, the refractive index n and extinction coefficient k of the metal greatly enhance the interference phenomenon of light passing through the aforementioned multilayer structure, so that the transmitted light shows obvious color. At this time, the color of the entire film is not only determined by the material of the electrochromic layer, but is the result of the synthesis of each film layer. The present invention enriches the color of the inorganic electrochromic thin film by utilizing the thin film interference, so that it is not limited to the intrinsic color of the electrochromic material.

The current collecting interference layer has dual functions of conduction and interference. It is found in experiments that the metal Ti with higher resistivity cannot have a good multi-color transmission effect when used as the current collecting interference layer. The sacrificial layer is used to prevent the oxygen in the transition metal oxide of the electrochromic layer from entering the current collector and interference layer, so the sacrificial layer and the electrochromic layer are respectively metal/alloy and their corresponding oxides, so that even if the oxygen in the transition metal oxide of the electrochromic layer migrates to the sacrificial layer, the oxide formed by the oxidation of the sacrificial layer can be regarded as the transition metal oxide used to compose the electrochromic layer. The whole film still has the complete electrochromic function of colorful transmission and long life.

In the inorganic multi-color transmission electrochromic thin film, the material of the current collecting interference layer is preferably Ag, Au, Cu, Al or their alloys. These preferred metals/alloys can produce better interference phenomena, so that the transmitted/pass-through light shows a more pronounced variety of colors.

In the inorganic multi-color transmission electrochromic thin film, the transition metal oxide is preferably at least one of $WO_3$, $TiO_2$, and $V_2O_5$.

In the inorganic multi-color transmission electrochromic thin film, the thickness of the current collecting interference layer is preferably 8-10 nm.

In the inorganic multi-color transmission electrochromic thin film, the thickness of the sacrificial layer is preferably 1-5 nm.

Preferably, in the inorganic multi-color transmission electrochromic thin film, a dielectric layer is provided on the other side of the current collecting interference layer. The thickness of the dielectric layer is preferably 1-10 nm, and the material is preferably at least one of $TiO_2$, $SnO_2$, ZnO, $Si_3N_4$, and $SiO_2$.

Preferably, in the inorganic multi-color transmission electrochromic thin film, an electron blocking layer is provided on the other side of the electrochromic layer. The thickness of the electron blocking layer is preferably 1-10 nm, and the material is preferably at least one of $SiO_2$, $Si_3N_4$, and $Ta_2O_5$.

The present invention also provides an inorganic multi-color transmission electrochromic coated glass, which comprises a glass substrate and the inorganic multi-color transmission electrochromic film which are stacked in sequence. In the inorganic multi-color transmission electrochromic thin film, the closest to the glass substrate is a current collecting interference layer or a dielectric layer.

The present invention also provides a preparation method of the inorganic multi-color transmission electrochromic coated glass, comprising: adopting a coating method of DC reactive magnetron sputtering or electron beam evaporation, on the glass substrate, each layer is sequentially deposited according to the structure of the inorganic multi-color transmission electrochromic film.

As a general inventive concept, the present invention also provides a design method of the inorganic multi-color transmission electrochromic film, comprising the steps of:

(1) Spectroscopic ellipsometry is used to measure the ellipsometry parameters of various constituent materials that can be used to make each layer of the inorganic multi-color transmission electrochromic film, denoted as $\cos \Delta_i$ and $\tan \Psi_i$, $\Delta$ represents relative phase change, and $\Psi$ represents relative amplitude attenuation. Selecting the corresponding dispersion model according to the constituent materials, and using the Fresnel formula to establish the functional relationship between the refractive index n, extinction coefficient k and film thickness d of each constituent material and the ellipsometry parameter, denoted as $\cos \Delta_i(n,k,d)$ and $\tan \Psi_i(n,k,d)$. Regression algorithm is used to obtain the refractive index n and extinction coefficient k of each of the constituent materials. The mean square error function MSE between $\cos \Delta_i$, $\tan \Psi_i$ and $\cos \Delta_i(n,k,d)$, $\tan \Psi_i(n,k,d)$ is used as regression judging standard formula:

$$MSE = \sum_{Vis}[(\cos\Delta_i - \cos\Delta_i(n, k, d))^2 + (\tan\psi_i - \tan\psi_i(n, k, d))^2].$$

(2) According to the color change requirements and service requirements, based on the thin film optics principle, and according to the refractive index n and extinction coefficient k of each of the constituent materials, the specific materials composing each layer of the inorganic multi-color transmission electrochromic film are determined, and the film layer structure is determined.

(3) Based on the thin film optics principle, using the refractive index n and extinction coefficient k of the specific materials of each layer, according to the determined film layer structure, the color change state of the electrochromic layer and the thickness of each layer are used as variables to calculate the transmittance in the visible light range. The target thickness of each layer is then optimized according to the transmittance-chromaticity relationship.

In step (1), the dispersion model can be selected from existing ones, including:

(a) The dispersion relation of the complex permittivity, its equation can be expressed as:

$$\varepsilon(E) = \varepsilon_1(E) + i\varepsilon_2(E)$$

According to the above equation, if a particular physical model contains multiple oscillators, these parameters can be added arithmetically. Therefore, the real and imaginary parts of the dielectric function can be expressed as:

$$\varepsilon_1(E) = \varepsilon_\infty + \sum_i \varepsilon_{1,i}(E)$$

$$\varepsilon_2(E) = \sum_i \varepsilon_{2,i}(E)$$

wherein, $\varepsilon_{1,i}$ and $\varepsilon_{2,i}$ are the real and imaginary parts of the ith oscillator dielectric function, respectively.

(b) Drude dispersion equation is suitable for describing the electrical conduction of quasi-free electrons in metals or carriers in semiconductors, and its dielectric function can be expressed as:

$$\varepsilon_1(E) = -\frac{\left(\frac{E_P}{E}\right)^2}{1 + \left(\frac{E_\Gamma}{E}\right)^2}$$

$$\varepsilon_2(E) = \frac{E_\Gamma}{E} \frac{\left(\frac{E_P}{E}\right)^2}{1 + \left(\frac{E_\Gamma}{E}\right)^2}$$

wherein, $E_P$ is the plasma energy, $E_\Gamma$ is the scattering frequency-dependent broadening, and $\varepsilon_1$ and $\varepsilon_2$ are the real and imaginary parts of the dielectric function, respectively.

(c) The classical Lorentz oscillator model is based on the classical motion equations of harmonic dipole oscillators in viscous media. It is suitable for semiconductors and insulators with resonant polarization as the main dispersion relation. Its dielectric function can be expressed as:

$$\varepsilon_1(E) = \frac{fE_0^2(E_0^2 - E^2)}{(E_0^2 - E^2)^2 + \Gamma^2 E^2}$$

$$\varepsilon_2(E) = \frac{fE_0^2 \Gamma E}{(E_0^2 - E^2)^2 + \Gamma^2 E^2}$$

wherein f is the oscillation strength. $E_0$ is the oscillation position, $\Gamma$ is the oscillation width, and $\varepsilon_1$ and $\varepsilon_2$ are the real and imaginary parts of the dielectric function, respectively.

(d) The Sellmeier oscillator model is a widely used model for transparent materials, and its dielectric function can be expressed as:

$$\varepsilon_1 = \frac{B\lambda^2}{\lambda^2 - \lambda_0^2}$$

$$\varepsilon_2 = 0$$

wherein, $\lambda$ is the photon wavelength, and the parameters B and do are the oscillator amplitude and position (effective resonance wavelength), respectively.

The present invention is based on thin film optics and Fabry-Perot resonant cavity interference principle, and proposes a multilayer thin film structure consisting of a dielectric layer (optionally added), a current collecting interference layer, a sacrificial layer, an electrochromic layer, and an electron blocking layer (optionally added). On the basis of ensuring the transparency of glass, the color diversity of inorganic electrochromic coated glass is greatly enriched.

Compared with the prior art, the main advantages of the present invention include: the present invention uses metals and metal oxides as the base film material, uses a spectral ellipsometer to measure the complex refractive index of the film material, and is based on the Fabry-Perot resonant cavity interference principle, put forward the design principle and preparation method of the multilayer film form of multi-color transmission electrochromic film, which can greatly shorten the product development cycle and reduce the preparation cost, the obtained product has various colors and can be adjusted artificially, realizes fine control of color, and at the same time has the performance of reversible change in transparent and opaque states, realizes photothermal modulation of indoors to achieve energy saving effect, and is suitable for the development and production of both architectural decoration and energy-saving coated glass.

PREFERRED EMBODIMENTS OF THE INVENTION

The present invention will be further described below with reference to the accompanying drawings and specific embodiments. It should be understood that these examples are only used to illustrate the present invention and not to limit the scope of the present invention. The operation method without specifying the specific conditions in the following examples is usually in accordance with the conventional conditions, or in accordance with the conditions suggested by the manufacturer.

Ultraviolet-visible spectrum: The transmission spectrum is observed with a spectrophotometer, and the equipment model is Agilent's Cary5000.

Measurement and analysis of ellipsometry: a photometric ellipsometry is used, the equipment model is GES-5E of Semilab, and the software SEA (WinElli 3) v1.6.1 is used for data analysis.

Figure 1:
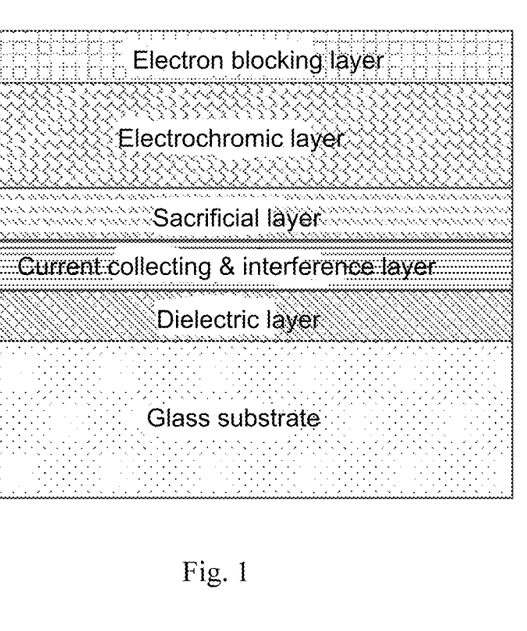
FIG. 1 is the structural representation of the inorganic multi-color transmission electrochromic coated glass of the present invention.
Figure 2:
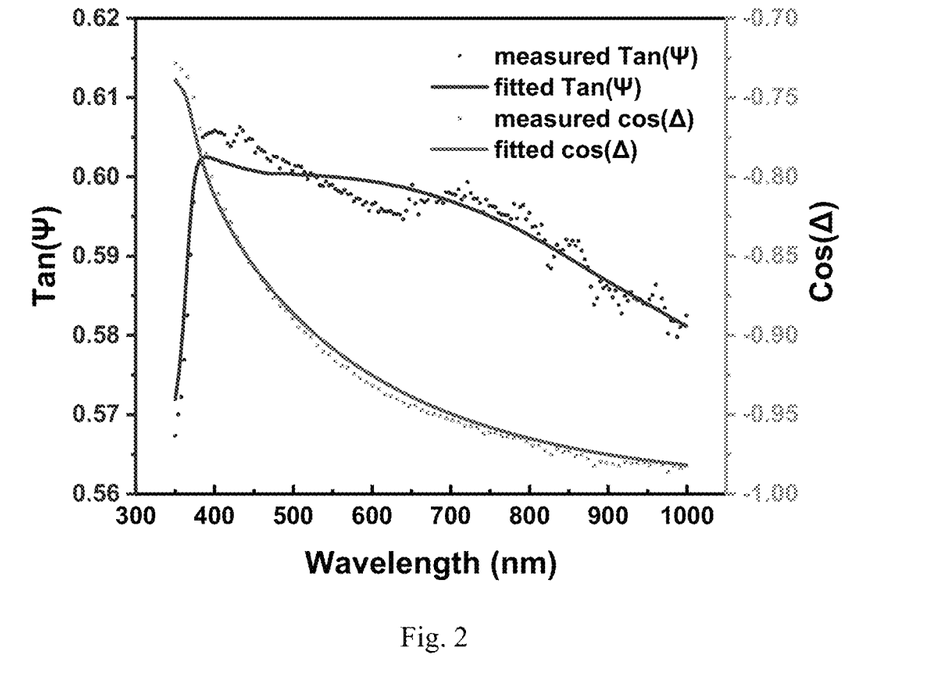
FIG. 2 is the ellipsometry fitting result diagram of the W thin film sample, wherein, the solid line is the model simulation value, and the dotted line is the measured value.
Figure 3:
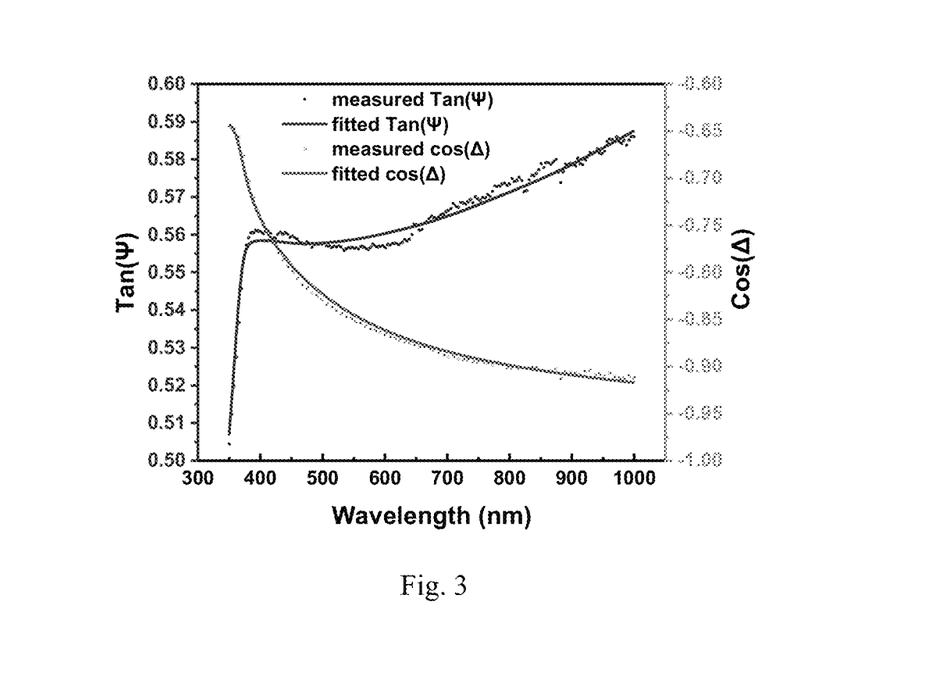
FIG. 3 is the ellipsometry fitting result diagram of Ag—W thin film sample, wherein, the solid line is the model simulation value, and the dotted line is the measured value.
Figure 4:
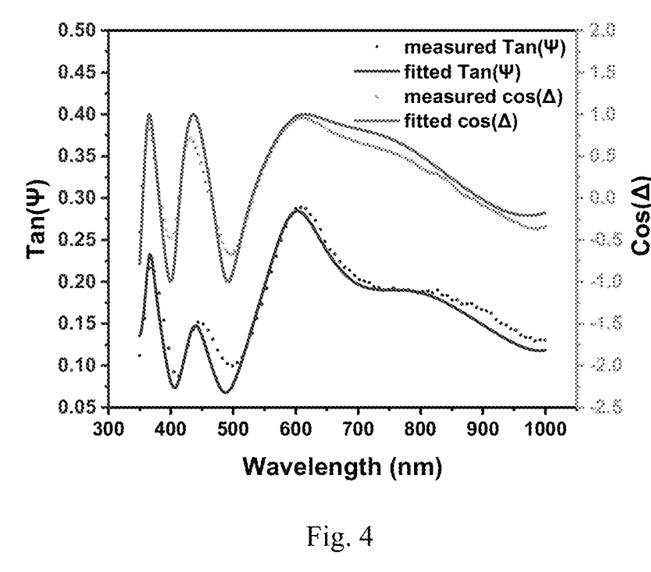
FIG. 4 is the ellipsometry fitting result diagram of the faded $WO_3$ film sample, wherein the solid line is the model simulation value, and the dotted line is the measured value.
Figure 5:
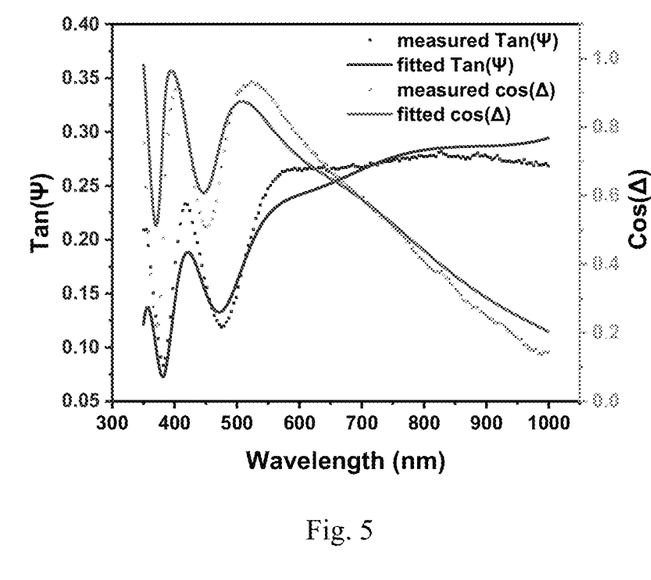
FIG. 5 is the ellipsometry fitting result diagram of the colored $WO_3$ thin film sample, wherein, the solid line is the simulated value of the model, and the dotted line is the measured value.

The structure of the inorganic multi-color transmission electrochromic coated glass of the present invention is shown in FIG. 1, including a glass substrate, a dielectric layer (optionally added), a current collecting and interference layer, a sacrificial layer, an electrochromic layer and an electron blocking layer (optionally added) stacked in sequence.

The design idea and preparation method of inorganic multi-color transmission electrochromic thin films are now described with specific materials as examples. Metal Ag is used as the current collecting interference layer material, metal W is used as the sacrificial layer material, and WO3 is used as the electrochromic layer material. Among them, the dielectric layer and the electron blocking layer are optional, and are not added in this embodiment.

In order to obtain the ellipsometric parameters of the single-layer material, the corresponding thin film material was prepared on the silicon wafer by the DC reactive magnetron sputtering method. The working power used to prepare the Ag layer: 100 W, the working pressure: 0.2 Pa, and the argon flow rate: 30 sccm. The working power used to prepare the W layer: 80 W, the working pressure: 0.8 Pa, and the argon flow rate: 30 sccm. The working power used to prepare the $WO_3$ layer: 80 W, the working air pressure: 0.8 Pa, the argon flow rate: 30 sccm, and the oxygen flow rate: 15 sccm.

Figure 6:
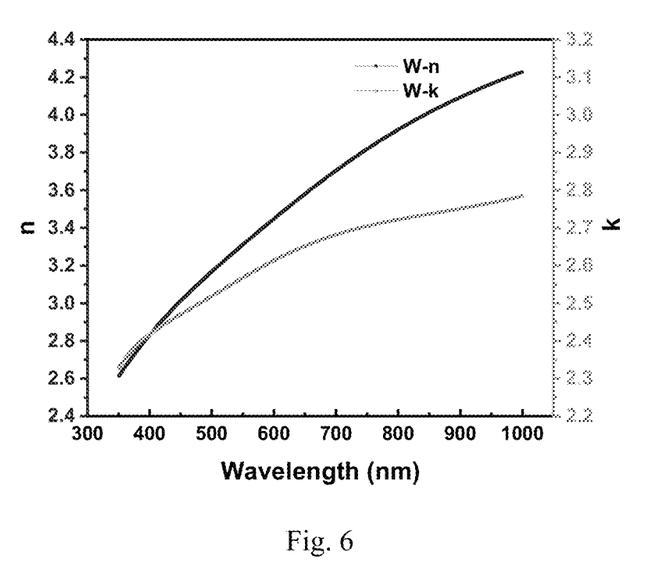
FIG. 6 is a graph of the refractive index and extinction coefficient of W.
Figure 7:
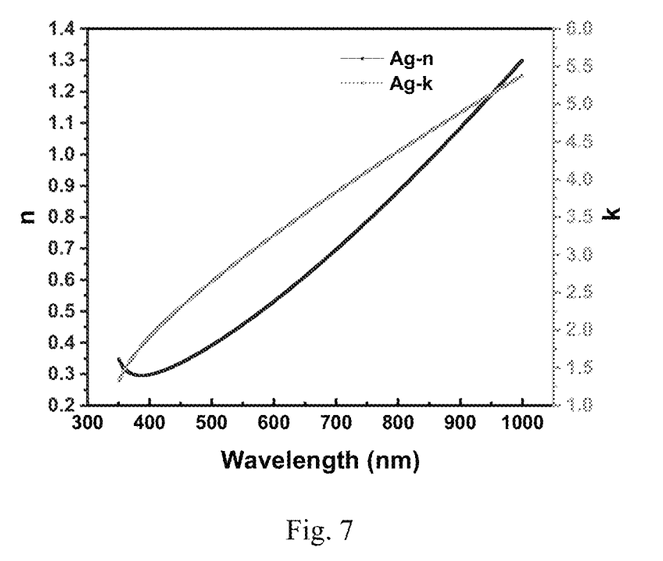
FIG. 7 is a graph of the refractive index and extinction coefficient of Ag.
Figure 8:
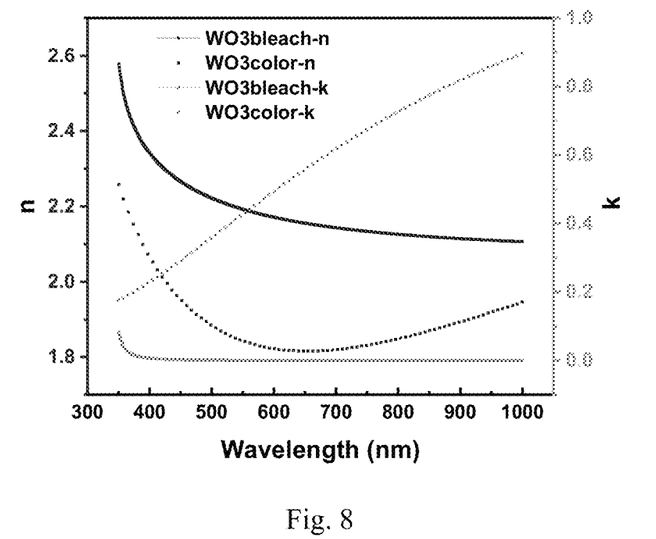
FIG. 8 is a graph of the refractive index and extinction coefficient of $WO_3$ in a faded state and a colored state.

Spectroscopic ellipsometry was used to measure the samples respectively, the measurement spectral range was 350 nm~1000 nm, the incident angle was set to 62°, and the ellipsometry parameters $\cos \Delta_i$ and $\tan \Psi$ were obtained. A suitable dispersion model was established for each material. The Ag layer useD a Drude dispersion equation and a Lorentz oscillator model to describe the optical parameters. The initial values are set to $E_P=7.4$, $E_T=0.6$, $f=0.6$, $E_0=4.2$, $\Gamma=0.15$. The W layer used a Drude dispersion equation and three Lorentz oscillator models to describe the dispersion relationship, the initial value is set to $E_P=8.5$, $E_T=3.7$, ① ($f=2.6$, $E_0=5.8$, $\Gamma=0.17$), ② ($f=6.3$, $E_0=1.8$, $\Gamma=2.16$), ③ ($f=9.7$, $E_0=3.9$, $\Gamma=4.95$). The faded $WO_3$ layer adopted a Sellmeier oscillator model and a Lorentz oscillator model to describe the optical parameters, the initial value is set to $B=4.2$, $\lambda_0=0.2$, $f=0.1$, $E_0=3.7$, $\Gamma=0.12$. The colored $WO_3$ layer used a Drude dispersion equation and three Lorentz oscillator models to describe the dispersion relationship, and the initial values were set to $E_P=3.2$, $E_T=3.6$, ① ($f=0.4$, $E_0=5.2$, $\Gamma=0.88$), ② ($f=3.0$, $E_0=5.6$, $\Gamma=0.00$), ③ ($f=3.2$, $E_0=1.3$, $\Gamma=2.97$). The functional relationship $\cos \Delta_i(n,k,d)$ and $\tan \Psi_i(n,k,d)$ of the refractive index n, extinction coefficient k and film thickness d of Ag, W and $WO_3$ and the ellipsometry parameters were established by using the above-established structural model and dispersion model combined with the Fresnel formula, and giving the MSE function to find a set of parameters that make MSE get the minimum value. The $\cos \Delta_i(n,k,d)$ and $\tan \Psi_i(n,k,d)$ (calculated values) regressed by this method have a high degree of fit with $\cos \Delta_i(n,k,d)$ and $\tan \Psi_i(n,k,d)$ (measured values), as shown in FIG. 2-5, the best fit result returns the minimum value of MSE of $1.89 \times 10^{-3}$. FIGS. 6-8 are graphs of the relationship between refractive index n/extinction coefficient k-wavelength $\lambda$ fitted to Ag, W and $WO_3$ thin film samples.

According to the optical parameters of each material obtained in FIGS. 6-8, the glass/Ag/W/$WO_3$ multilayer film was used as the design structure, and the transmittance and corresponding chromaticity of the target structure were calculated based on the optical principle of thin films, and high transmittance and high saturation multi-color were the optimization target, the theoretical parameters of Ag layer thickness not greater than 10 nm, W layer thickness not greater than 5 nm, and $WO_3$ layer thickness ranging from 100 to 300 nm were determined.

Figure 9:
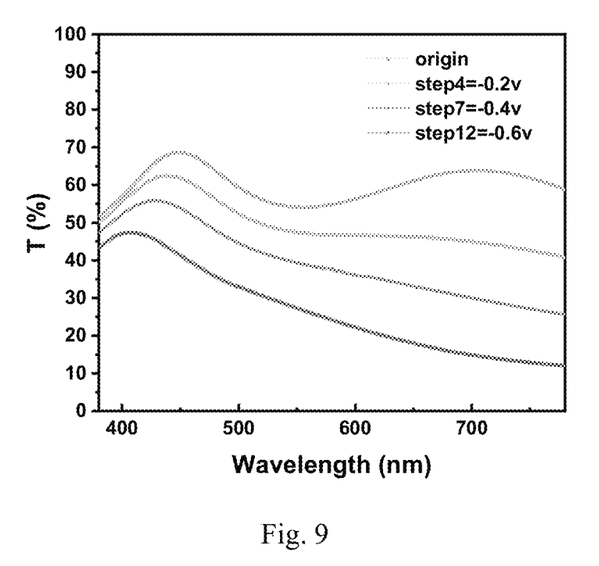
FIG. 9 is the transmittance diagram of the example glass/Ag (10 nm)/W (2 nm)/$WO_3$ (210 nm) multilayer structure coated glass under different voltages.
Figure 10:
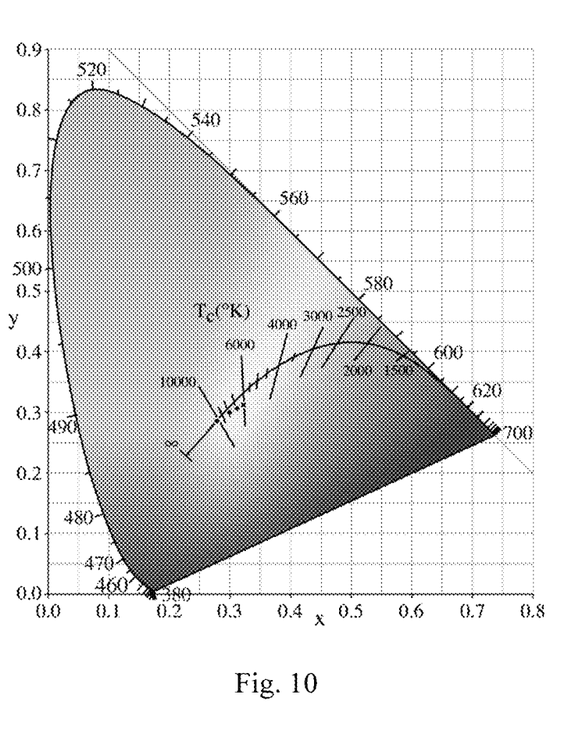
FIG. 10 is a graph showing the variation of transmission color with voltage according to the CIE1931x-y chromaticity coordinates of the example glass/Ag (10 nm)/W (2 nm)/$WO_3$ (210 nm) multilayer structure coated glass.

Coated glass with glass/Ag/W/$WO_3$ multilayer structure was prepared by DC reactive magnetron sputtering method. Taking the prepared glass/Ag (10 nm)/W (2 nm)/$WO_3$ (210 nm) sample as an example, FIG. 9 and FIG. 10 were the transmittance and the corresponding CIE1931x-y chromaticity coordinates of the sample under different voltages, showing multi-color changes.

In addition, it should be understood that after reading the above description of the present invention, those skilled in the art can make various changes or modifications to the present invention, and these equivalent forms also fall within the scope defined by the appended claims of the present application.

The invention claimed is:

1. An inorganic multi-color transmission electrochromic coated glass, consisting of a glass substrate coated with an inorganic multi-color transmission electrochromic thin film, the inorganic multi-color transmission electrochromic thin film consisting of a dielectric layer, a current collecting interference layer, a sacrificial layer, an electrochromic layer and an electron blocking layer stacked in sequence;

wherein the closest to the glass substrate is the dielectric layer, the dielectric layer is provided between the current collecting interference layer and the glass substrate, the thickness of the dielectric layer is 1-10 nm, and a material of the dielectric layer is at least one of $TiO_2$, $SnO_2$, ZnO, $Si_3N_4$, and $SiO_2$;

wherein the thickness of the current collecting interference layer is 8-20 nm, and a material of the current collecting interference layer is a metal or alloy whose resistivity is less than $2.1 \times 10^{-7}$ Ω·m;

wherein the thickness of the sacrificial layer is 1-10 nm, and a material of the sacrificial layer is the metal or its alloy in the transition metal oxide;

wherein the thickness of the electrochromic layer is 100-300 nm, and a material of the electrochromic layer is a transition metal oxide;

wherein the electron blocking layer is provided on the other side of the electrochromic layer, the thickness of the electron blocking layer is 1-10 nm, and the material is at least one of $SiO_2$, $Si_3N_4$, and $Ta_2O_5$;

wherein, the material of the current collecting interference layer is Ag, Au, Cu, Al or their alloys; and     wherein, the transition metal oxide is at least one of $WO_3$, $TiO_2$, and $V_2O_5$.

2. A preparation method of the inorganic multi-color transmission electrochromic coated glass, comprising: adopting a coating method of DC reactive magnetron sputtering or electron beam evaporation, on the glass substrate, each layer is sequentially deposited according to the structure of the inorganic multi-color transmission electrochromic coated glass according to claim 1.

* * * * *